United States Patent [19]

Huckabay et al.

[11] 4,320,474

[45] Mar. 16, 1982

[54] SATURATION LIMITED PARAMETRIC SONAR SOURCE

[75] Inventors: John M. Huckabay; Reuben H. Wallace, both of Austin, Tex.

[73] Assignee: The United States of America as represented by the Secretary of the Navy, Washington, D.C.

[21] Appl. No.: 210,096

[22] Filed: Nov. 24, 1980

[51] Int. Cl.[3] .......... H04B 1/02

[52] U.S. Cl. .......... 367/138; 367/92

[58] Field of Search .......... 367/92, 137, 138

[56] References Cited

U.S. PATENT DOCUMENTS 3,613,069 10/1971 Cary, Jr. et al. .......... 367/92

3,964,013 6/1976 Konrad .......... 367/137

*Primary Examiner*—Richard A. Farley

*Attorney, Agent, or Firm*—R. F. Beers; Prithvi C. Lall; A. P. Durigon

[57] ABSTRACT

A selected increase in the farfield amplitude of the difference frequency beam of saturation limited parametric sonar sources is obtained by an array of saturation limited parametric sources having a center-to-center spacing selected such that the primary beams launched by each source coexist in a common region where attenuation has reduced the amplitude of each primary beam to a level which precludes saturation. The selected center-to-center spacing depends upon the number of individual sources implemented and each doubling of the number of selectively spaced sources provides at least a 3 dB increase in the farfield difference frequency amplitude without changing the nominal directivity characteristics of the parametric source.

8 Claims, 3 Drawing Figures

SATURATION LIMITED PARAMETRIC SONAR SOURCE

BACKGROUND OF THE INVENTION

This invention is drawn to the field of parametric acoustic sources, and more particularly, to such sources which are saturation limited.

A directional sonar source operating parametrically in a nonlinear medium at selected primary frequencies results in a directional difference frequency beam of sonic energy having low sidelobes. But as the electrical drive level of the primaries is increased, the acoustic amplitude of the difference frequency does not increase indefinitely. The farfield difference frequency amplitude progressively levels off and approaches a limiting value practically independent of the drive level. Such sources are saturation limited. With further increase in drive level above the limit of saturation, energy at the primary frequencies is converted into energy at harmonic frequencies forming multiple shock waves which are rapidly dissipated in the medium and lost as heat.

A known technique for attempting to increase the farfield amplitude of the difference frequency beam of such saturation limited parametric sources, reported by Muir et. al. at 62 J. Acoust. Soc. Am 271 (1977), launches a multifrequency saturation limited primary beam from a parametric array toward a pressure release reflector. The primary beam distorts as it propagates generating repeated shocks. Upon reflection from the pressure release reflector, a 180° phase reversal creates unstable shocks that subsequently undistort such that most of the energy of the harmonic components of the shock waves returns to the primaries providing higher sound pressure levels at remote field points before the limit of saturation takes effect. The difference frequency sound beam likewise undergoes a 180° phase shift at the pressure release reflector; however, the phase shifted difference frequency beam destructively interferes with the difference frequency beam parametrically produced before reflection causing a reduction in the amplitude of the difference frequency beam. Thus it is desireable to provide a means and method for selectively increasing the farfield difference frequency amplitude of parametric sonar sources which are saturation limited.

SUMMARY OF THE INVENTION

A selected increase in the farfield amplitude of the difference frequency beam of saturation limited parametric sonar sources is obtained by an array of saturation limited parametric sources having a center-to-center spacing selected such that the primary beams launched by each source coexist in a common region where attenuation has reduced the amplitude of each primary beam to a level which precludes saturation. The selected center-to-center spacing depends upon the number of individual sources implemented and each doubling of the number of selectively spaced sources provides at least a 3 dB increase in the farfield difference frequency amplitude without changing the nominal directivity characteristics of the parametric source.

Accordingly, it is an object of this invention to obtain a selected increase in the farfield difference frequency amplitude of saturation limited parametric sonar sources.

Another object is to obtain a selected increase in the farfield difference frequency amplitude of saturation limited parametric sources while retaining the nominal directivity characteristics of such sources.

Other objects, advantages and noval features of the present invention will become apparent from the appended claims and the following detailed description, when considered in conjunction with the following drawings, wherein:

DETAILED DESCRIPTION OF THE INVENTION

Figure 1:
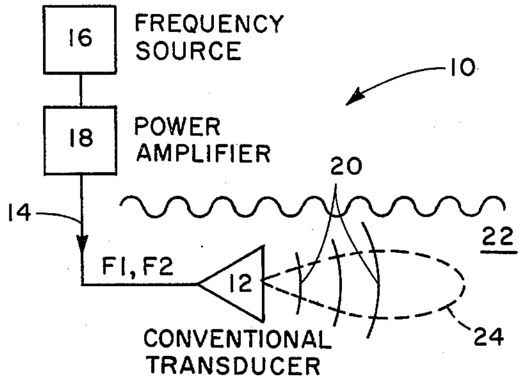
FIG. 1 is a schematic view of a conventional parametric array.

Referring now to FIG. 1, which shows a prior art parametric source generally designated at 10, a directional transducer 12 is driven at two selected frequencies F1 and F2 over line 14 by suitable means shown as frequency source 16 and amplifier 18. The transducer produces a dual frequency sound beam 20, commonly referred to as the primary beam, in medium 22.

Because the acoustic medium is not linear, signals at new frequencies are parametrically generated along the length of the primary beam as the primary beam propagates. The lowest of these frequencies is the difference of the two primary frequencies, |F1−F2|, and is commonly referred to as the difference frequency intermodulation product or difference frequency beam.

The difference frequency beam, generated through the nonlinear interaction of the frequency components of the primary beam in the medium, has a number of properties that make it useful for practical applications in echo ranging and in secure communications. These properties include low sidelobes and a narrow beamwidth from a relatively small aperture. A beam pattern at the difference frequency of the parametric source 10 is shown at 24.

The farfield amplitude of the difference frequency beam of sonic energy of the source 10 is determined by the attenuation and source level of the radiation at the primary frequencies. As the electrical drive level is increased, the amplitude of the difference frequency beam is limited by saturation of the primary beam. As discussed in the background of the invention, saturation is characterized by the generation of harmonics of the primary frequencies resulting in shock formation in the medium. This phenomena renders the farfield amplitude of the difference frequency beam practically independent of the primary source level thereby placing an upper limit on the farfield amplitude of the difference frequency beam of the parametric source 10. As will appear more fully below, the saturation induced limit on the farfield difference frequency amplitude of parametric sources is selectively increased by the present invention by providing an array of properly positioned parametric sources which are saturation limited without changing the nominal directivity characteristics of the source.

Figure 2:
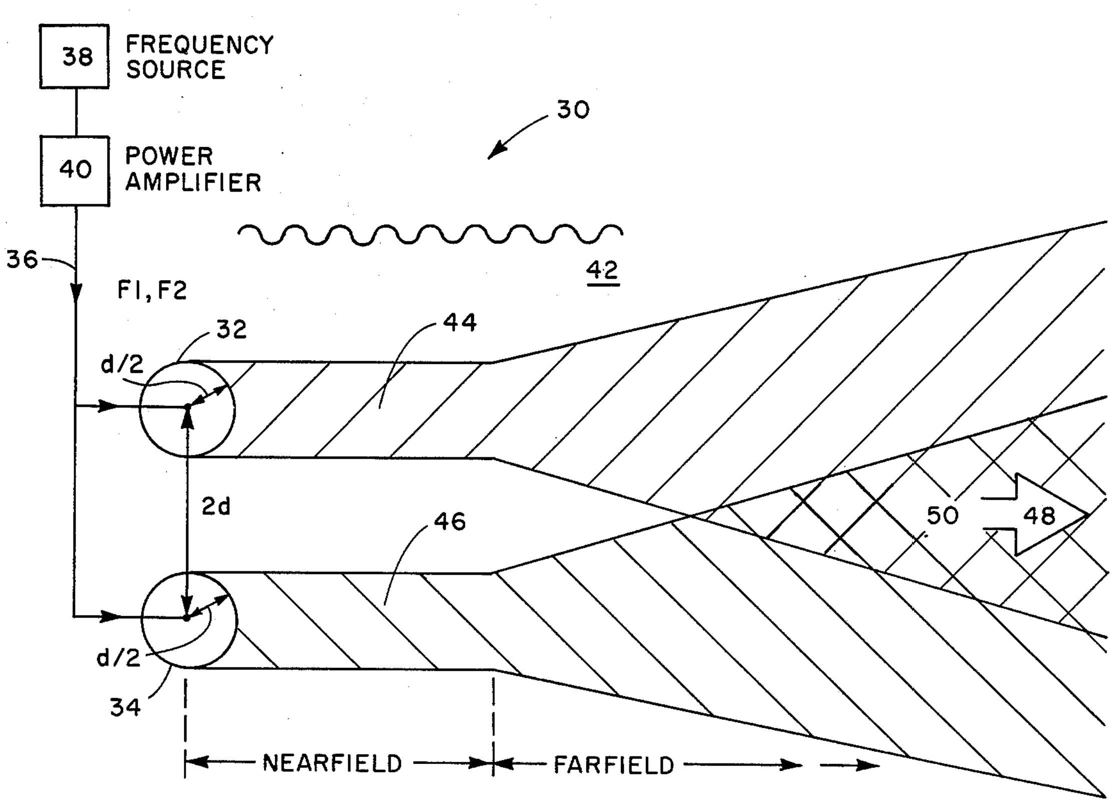
FIG. 2 is a schematic view of an embodiment of a parametric array according to the present invention.

Referring now to FIG. 2, generally designated at 30 is an array of parametric sources according to the present invention. Source 30 is shown as consisting of two primary sources 32 and 34, each of which is a planar circular transducer of radius (d/2) driven at or slightly below saturation at primary frequencies F1 and F2 over lines 36 by suitable means shown as frequency source 38 and amplifier 40. Saturation limited primary sources 32 and 34 are operated in a kd region selected to provide a moderately directive radiation field, where k is the average wave number of the primary frequencies. The specification of kd$\gtrsim$30 is illustrative of an operating regime providing the directive radiation field.

As shown, each of the primary sources launches in medium 42 a dual frequency primary beam 44 and 46 collimated in the nearfield and spherically spreading in the farfield. The primary frequencies launched in the primary beams of each directional primary source interact and parametrically generate two difference frequency beams, not illustrated, as the primary beams propagate. The difference frequency beams interfere and the coexistent primary radiation 44 and 46 parametrically interact in crosshatched common region 50 producing a resultant difference frequency beam 48.

Figure 3:
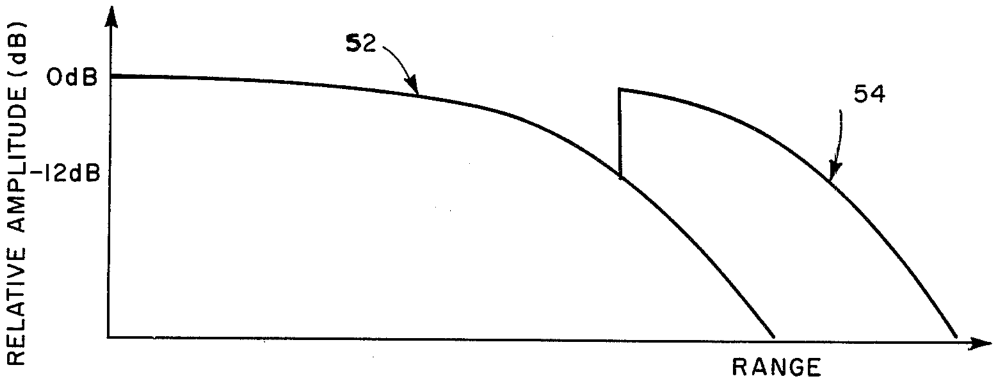
FIG. 3 is a graph depicting the operation of the embodiment of FIG. 2.

As shown by curve 52 of FIG. 3, by selectively spacing the primary sources 32 and 34 apart a center-to-center distance of 2d, the magnitude of the radiation 44 and 46 produced by each saturation limited directional primary source is reduced by 12 dB due to spreading and absorption losses in propagating to the range corresponding to the onset of the common region 50. In the case of the two primary source configuration, the 12 dB of reduction is sufficient to preclude saturation in common region 50 since the magnitude of the combined primary pressure field in this region can be increased, at most, by 12 dB as shown by curve 54 of FIG. 3. That is, a 6 dB increase in peak pressure level results from the doubling of the acoustic energy in the common region 50 of the primary beams 44 and 46, and an additional 6 dB is provided to accommodate an increase in peak pressure level which results when signals at different frequencies are summed.

Since the difference frequency beam 48 is produced as a result of the interference of the difference frequency beams and of the parametric interaction of the coexistent primary beams in common region 50 where attenuation has reduced the amplitude of the primary radiation to a value which precludes saturation, a 3 dB increase in the farfield pressure amplitude of the difference frequency beam results from the increased power radiated by the array of parametric sources 30. An additional increase in excess of 1 dB in the farfield amplitude results from the parametric interaction of the coexistent primary beams. It is noted that an increase in difference frequency source level is realized if one of the individual parametric sources is not saturation limited; however, the use of two saturation limited sources provides a maximum increase in the farfield amplitude of the difference frequency which may be attained with the two primary source configuration.

It is to be clearly understood that more than two saturation limited directional primary sources may be used in an array of parametric sources according to the present invention. On increasing the number of individual primary sources utilized, a further reduction in primary beam amplitude level before the mutual interaction of the primary beams is required in order to preclude the saturation limitation in the combined pressure field in the common region. To satisfy this constraint, the center-to-center spacing is increased in proportion to the number of additional sources added so that spreading and absorption losses reduce the magnitude in the combined pressure field in the common region to a value which precludes saturation. If four saturation limited directive primary sources are used, a center-to-center spacing of 4d, with correlative 24 dB reduction, results in at least a 6 dB increase in the farfield amplitude of the difference frequency beam due to the increased power provided by four primary sources.

The directivity characteristics of the array of parametric sources of the present invention is nominally the same as that for the single parametric source illustrated in FIG. 1. The directivity pattern for an array of directional primary sources is given by the product of the pattern for an individual source with the pattern for the combination array assuming each source is omnidirectional. As known by those skilled in the art, provided the spacing is not too great, the diffraction pattern determined by the spacing of the individual sources will be broad and the pattern for the array of primary sources will be dominated by the pattern of the individual primary sources. These parameters principally insure that the directivity of the array of parametric sources 30 is nominally the same as that for a single parametric source.

Many modifications of the present invention are possible. For example, the primary sources used to form the combination parametric source may be driven above saturation at different primary frequencies and may have either a nonplanar or noncircular geometry. As will be appreciated by those skilled in the art to which this invention appertains, the parameters specified in the present teaching are guidelines which will vary in accordance with the particular applications environment.

In summary, a means and method are provided for increasing the farfield amplitude of the difference frequency of a parametric source that is saturation limited. An array of parametric sources having a center-to-center spacing selected such that the primary beams produced by each array first begin to interfere at a range where spreading and absorption losses preclude saturation results in a selected increase in the farfield amplitude of the difference frequency beam.

We claim:

1. In a saturation limited parametric sonar source operating in a nonlinear medium, that improvement for selectively increasing the farfield difference frequency amplitude of a difference frequency beam of sonic energy produced by said saturation limited parametric sonar source which comprises:

a plurality of primary sources having a selected center-to-center spacing each launching a primary beam of sonic energy at least one of said primary beams is a multifrequency beam which is saturation limited, and said center-to-center spacing is selected such that said primary beams first begin to coexist in a common region of said nonlinear medium where spreading and absorption losses reduce the amplitude of said primary beams to a value which precludes saturation; whereby, for each doubling of the number of primary sources implemented, at least a 3 dB increase results in said farfield amplitude of said difference frequency beam of sonic energy.

2. The improvement of claim 1, wherein two planar circular transducers of diameter d are spaced apart a distance of 2d.

3. The improvement of claim 1 wherein 4 circular transducers of diameter d are spaced apart a distance of 4d.

4. The improvement of claims 2 or 3, wherein each of said transducers is operated in a kd region selected to provide a directive radiation field, where k is the average wave number of the primary frequencies.

5. The improvement of claim 4, wherein said kd region is greater than about 30.

6. A method providing a selected difference frequency amplitude in the farfield of a saturation limited parametric projector, comprising the steps of:

positioning a plurality of parametric sources each of which launches a multifrequency primary beam of sonic energy and at least one of which is saturation limited in a nonlinear medium; and selectively spacing said parametric sources apart in order to preclude saturation in a common region where said primary beams coexist.

7. The method of claim 6, further including the step of operating each of said plurality of parametric sources to provide a directional radiation pattern.

8. Parametric apparatus, comprising:

a first circular transducer of diameter d;

a second circular transducer of diameter d spaced apart from said first transducer a center-to-center spacing of 2d; and means for driving each of said transducers at at least two selected primary frequencies simultaneously at or just below saturation amplitude.

* * * * *